United States Patent [19]
Shockey

[11] Patent Number: 5,937,001
[45] Date of Patent: Aug. 10, 1999

[54] RANGE SAFETY COMMUNICATION SYSTEM AND METHOD UTILIZING PSEUDORANDOM NOISE SEQUENCES

[75] Inventor: Bruce Edward Shockey, Mason, Ohio

[73] Assignee: Cincinnati Electronics Corporation, Mason, Ohio

[21] Appl. No.: 08/880,053

[22] Filed: Jun. 20, 1997

[51] Int. Cl.[6] .................................................. H04B 1/69
[52] U.S. Cl. ........................................ 375/200; 375/208
[58] Field of Search ........................... 375/200, 206–210, 375/211, 259, 271, 279–281, 295, 302, 308, 316, 322, 324, 326, 329, 331, 332, 340, 343, 362, 365, 367, 377; 370/206, 207, 215, 315, 316; 455/7, 11.1, 12.1, 60, 228, 344, 345; 329/304; 332/103; 340/500, 501, 825.06, 825.14, 825.18, 825.3, 825.57, 825.58, 425.1; 244/3.1, 3.11, 3.14; 89/1.1, 1.11; 701/1–3, 36, 45, 99, 120, 122

[56] References Cited

U.S. PATENT DOCUMENTS

| | | | |
|---|---|---|---|
| 3,657,703 | 4/1972 | Steinlein | 340/825.63 |
| 3,737,776 | 6/1973 | Fletcher et al. | 375/308 |
| 4,837,786 | 6/1989 | Gurantz et al. | 370/206 |
| 5,018,685 | 5/1991 | Meuron et al. | 244/3.14 |
| 5,029,181 | 7/1991 | Endo et al. | 375/200 |
| 5,036,523 | 7/1991 | Briskman | 375/206 |
| 5,046,006 | 9/1991 | Revord et al. | 89/1.1 |
| 5,148,452 | 9/1992 | Kennedy et al. | 375/343 |
| 5,267,262 | 11/1993 | Wheatley, III | 375/200 |
| 5,365,544 | 11/1994 | Schilling | 370/342 |
| 5,414,728 | 5/1995 | Zehavi | 375/200 |
| 5,469,469 | 11/1995 | Haines | 375/201 |
| 5,495,509 | 2/1996 | Lundquist et al. | 375/367 |
| 5,631,921 | 5/1997 | Schilling | 375/200 |
| 5,687,190 | 11/1997 | Tsao | 375/206 |

Primary Examiner—Temesghen Ghebretinsae
Attorney, Agent, or Firm—Dinsmore & Shohl LLP

[57] ABSTRACT

A system and method for transmitting one or more range safety commands to a launch vehicle which includes transmitting structure having a pilot code generator and at least one additional code generator for generating at least one transmitter command code corresponding to a range safety command. A PN clock continuously locks the one or more transmitter command codes with the transmitter pilot code. Sequence selection structure selectively applies the one or more transmitter command codes to a modulator which combines the transmitter pilot code and the applied transmitter command codes with a carrier signal, and transmits the pilot and command codes through a relay satellite to the vehicle. Receiving structure in the vehicle recovers the pilot and command codes, and aligns a locally generated pilot code with the recovered pilot code. At least one local command code generator, which is synchronized to the local pilot code, is included in the receiving structure for generating one or more local command codes which correspond to the transmitter command codes. The local command codes and recovered transmitter command codes are sampled, and the samples compared over an acquisition period. If at the end of an acquisition period any set of samples exceeds a predetermined level of correspondence, then a hit detect signal is transmitted to decision logic in the vehicle. If all of the hit detect signals for a command are detected by the decision logic within a predetermined time interval, then the decision logic activates the command.

19 Claims, 4 Drawing Sheets

RANGE SAFETY COMMUNICATION SYSTEM AND METHOD UTILIZING PSEUDORANDOM NOISE SEQUENCES

TECHNICAL FIELD

The present invention relates to a system and method for providing range safety communications for a launch vehicle and, more particularly, to a system and method in which distinct pseudorandom noise sequences represent range safety commands, and a pilot code is transmitted with the command sequences through one or more relay satellites to synchronize the command sequences in the transmitter and receiver.

BACKGROUND OF THE INVENTION

As space exploration continues to expand, and ever more space shuttles, rockets, satellites and other aerospace vehicles are launched into orbit, there continues to exist a need for improved safety procedures for dealing with a catastrophic malfunction in a launch vehicle. One area of primary concern during the launching of a space vehicle is that the vehicle maintain its planned course as it exits the atmosphere and enters orbit. If a launch vehicle should get out of control or go off course during the first few minutes after launch, it could result in disastrous consequences depending upon whether and where the vehicle crashes back to earth. In order to protect the public from launch vehicles which veer off course or have been irretrievably damaged during take-off, the National Aeronautics and Space Administration (NASA) has developed control procedures which are known as range safety systems. Through these range safety systems, NASA is able to destroy an out of control launch vehicle before it causes harm to the public.

Traditionally, range safety procedures have involved monitoring the path of a launch vehicle on radar from the moment of launch until it exits the atmosphere, to assure that the vehicle stays within a planned flight range. If the vehicle stays within the desired range, as normally occurs, the vehicle is permitted to continue on its course, whether it be to enter orbit, in the case of a satellite or space shuttle, or reach an intended target, as in the case of a rocket. However, if the vehicle deviates from the intended range, or goes out of control to such an extent that it presents a safety issue to the earth below, then a series of range safety commands may be implemented which culminate in the destruction of the vehicle.

Range safety systems typically include a number of commands, including "Arm", "Destruct", "Safe" and/or "Test" commands, which can be selectively transmitted as radio signals from powerful FM transmitters to a launch vehicle. The Arm and Destruct commands are used to disable and destroy a vehicle respectively, in the event of a malfunction. The Arm command typically turns off the vehicle's rocket motors, while the Destruct command activates a pyrotechnic charge stored on the vehicle in order to destroy the vehicle. In contrast to the Arm and Destruct commands, the Safe command prevents the destruction of the vehicle. A Safe command is typically issued after the vehicle has exited the earth's atmosphere in order to disable the range safety system on the vehicle and prevent either an unintentional or malicious issuance of the Arm and/or Destruct commands.

Even with the most powerful FM transmitters available, it has been difficult if not impossible to effectively transmit range safety command signals to a launch vehicle using only a single transmitter. Therefore, in order to assure that the commands reach a launch vehicle, networks of down range tracking stations have been implemented to relay the command signals to the vehicle. The down range tracking stations in these networks have been spaced out across a large part of the globe in order to assure that the commands can reach the vehicle at each stage of its flight path. Implementing such a complex network of relay stations has required considerable personnel, expense and coordination.

In addition, range safety command signals have traditionally comprised codes made up of a series of eleven dual-tone characters. The specific dual-tone characters for each flight are selected and loaded into the ground transmitter and vehicle just prior to launch, under tight security, in order to limit access to the codes and, thus, the opportunity for sabotage or other undesirable extraneous interference. While the tight security and eleven character length help to reduce the risk of malicious transmission of the command signals, nevertheless a minor risk does exist that a saboteur could decipher the dual-tone codes in sufficient time to destroy or interfere with a launch vehicle. The risk of sabotage could be further reduced by increasing the length of the codes, however, the longer the code, the greater the time required to transmit and detect the code in the vehicle receiver. Therefore, since time can be a critical element in the event a launch vehicle is speeding uncontrollably off course, practical limits must be placed on the code length.

Although range safety commands have been transmitted to launch vehicles exclusively through FM transmitters and down range tracking stations, satellite communication systems have developed as the primary technique for transmitting flight data to the vehicles. The satellite system that has been primarily employed for these data communications is NASA's Tracking and Data Relay Satellite System or TDRSS. With the TDRSS system, flight data is transmitted to the vehicle by spread spectrum with a quadrature phase shift keying (QPSK) modulator and receiver. In this system, the data is spread by one or more pseudorandom noise (PN) pilot sequences and transmitted on the I channel of the QPSK modulator from a ground station to the appropriate TDRSS relay satellite. The relay satellite frequency converts and redirects the data signal to the launch vehicle. A receiver in the launch vehicle locks onto the QPSK carrier signal, and synchronizes a local pilot sequence in the receiver with the incoming pilot sequence in order to despread the flight data.

With certain launch vehicles, a second static pseudorandom noise sequence has been synchronized with the pilot code and transmitted on the Q channel of the QPSK modulator for ranging purposes, such as determining how far the vehicle is from the satellite. However, the use of the Q channel has been limited to this static sequence, and has not been expanded to include the transmission of data.

Accordingly, based upon the above-described complexities associated with present range safety communication systems, it is desirable to have an improved range safety communication system which eliminates the need for down range tracking stations and decreases the time required to transmit commands, while correspondingly increasing the security of the commands. Further, it is desirable to have an improved range safety communication system that is compatible with existing satellite communication systems.

SUMMARY OF THE INVENTION

Accordingly, it is a principal object of the present invention to provide an improved system and method for transmitting range safety command signals to a launch vehicle.

In particular, it is an object of the present invention to provide an improved range safety communication system and method which enables range safety command messages to be transmitted to a launch vehicle through NASA's Tracking and Data Relay Satellite System (TDRSS).

Another object of the present invention is to provide a range safety communication system and method wherein distinct pseudorandom noise sequences are utilized to represent the range safety commands.

Yet another object of the present invention is to provide such a range safety communication system and method in which the command signals are synchronized between the transmitter and receiver by way of an existing pilot sequence.

A further object of the present invention is to provide such a range safety communication system and method in which the command sequences are prealigned in the launch vehicle receiver prior to initiation of a command sequence.

A still further object of the present invention is to provide a range safety communication system and method which enables range safety commands to be transmitted to and detected in a launch vehicle in less time than existing dual-tone systems.

Yet another object of the present invention is to provide a range safety communication system which is more secure and less susceptible to sabotage than existing range safety communication systems.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention as described above, a system and method are provided for transmitting one or more range safety commands from a ground terminal to a launch vehicle. The system includes transmitting structure comprising a first code generator for generating a transmitter pilot code and at least one additional code generator for generating at least one transmitter command code corresponding to a range safety command. A timing control is provided for continuously locking the one or more transmitter command codes with the transmitter pilot code. Sequence selection structure selectively applies one or more of the transmitter command codes to a modulator which combines the transmitter pilot code and the applied transmitter command codes with a carrier signal to provide a modulated command signal, which is transmitted through a communications channel to a receiver in the vehicle.

The receiver recovers the transmitter pilot code and command codes from the modulated command signal, and aligns a locally generated pilot code with the recovered transmitter pilot code. At least one local command code generator, which is synchronized to the local pilot code, is provided in the vehicle for generating one or more local command codes which correspond to the transmitter command codes. To detect a range safety command in the vehicle, one or more recovered transmitter command codes are compared to each of the locally generated command codes during predetermined acquisition periods. If at the end of an acquisition period any of the local command codes exceed a predetermined level of correspondence with a recovered transmitter command code, then the command corresponding to that code is activated.

Still other objects of the present invention will become apparent to those skilled in this art from the following description wherein there is shown and described preferred embodiments of this invention, simply by way of illustration, including the best mode contemplated for carrying out the invention. As will be realized, the invention is capable of other different, obvious aspects all without departing from the invention.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Reference will now be made to the presently preferred embodiments of the invention, examples of which are illustrated in the accompanying drawings. The present invention comprises a communication system and method for transmitting range safety commands from transmitting structure, which is preferably located at a base or ground terminal, to a receiving structure, which is preferably associated with a vehicle. In the present invention, a series of distinct codes, such as distinct PN sequences, are used to represent the Arm, Destruct, Safe and Test range safety commands. The PN sequence or sequences selected for each command are loaded into the receiving structure in the vehicle and the ground terminal transmitting structure before the vehicle is launched. In the event flight termination becomes necessary, or another type of procedure must be activated, one or more of the command sequences may be sent from the ground terminal to the vehicle, preferably through a relay satellite.

Figure 1:
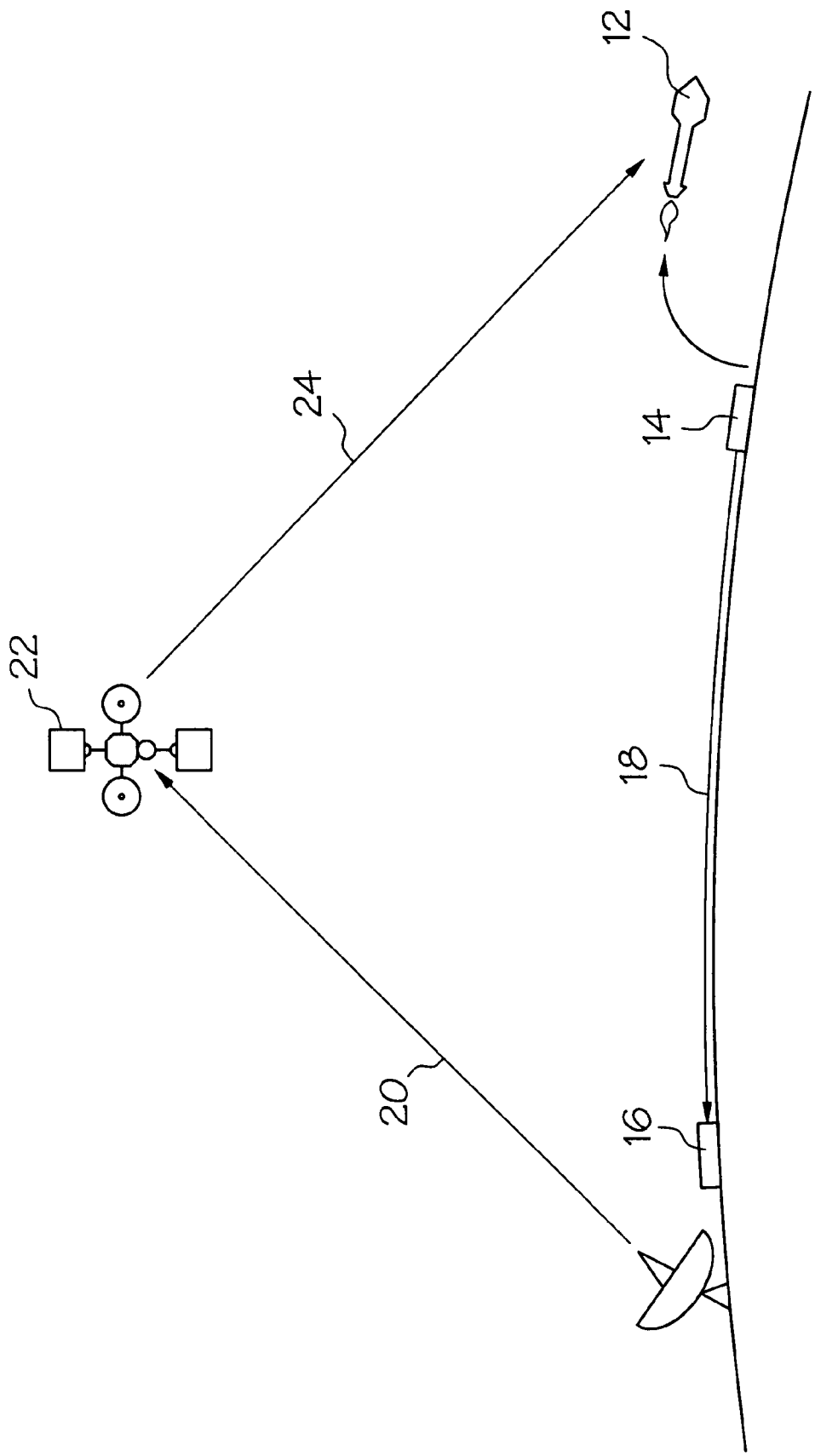
FIG. 1 is a signal path diagram for a range safety command signal in accordance with a representative embodiment of the present invention.

FIG. 1 depicts a schematic representative embodiment of a range safety command signal path, in accordance with the present invention. As shown FIG. 1, the system and method of the present invention are designed for use with a vehicle, such as a launch vehicle 12, for transmitting commands to the vehicle in the event of a malfunction. A command center 14 is normally associated with the vehicle 12 for directing its launch and operation. The command center 14 preferably includes personnel and monitoring and control equipment for controlling the operation of the vehicle. The command center 14 may be similar to existing command centers presently used in conjunction with the space shuttles and other launch vehicles. From the command center 14, flight control data and range safety commands may be transmitted through a communication link 18 to a ground or base terminal 16. The ground terminal 16 includes transmitting structure for processing the commands and forwarding the data and commands to the vehicle 12. The processing and transmission of the range safety commands by the transmitting structure will be described in more detail below.

Range safety commands and flight data from the ground terminal are preferably transmitted to the vehicle 12 through a signal relay device, such as a relay satellite 22. In a representative embodiment of the present invention, the relay satellite 22 is NASA's Tracking and Data Relay Satellite System (TDRSS), and the ground terminal 16 is the TDRSS ground terminal presently located in White Sands, N. Mex. While the present invention is described with respect to its use with the TDRSS relay satellite and the White Sands ground terminal, it is to be understood that the invention is not limited to this application, and that it may be utilized with other relay satellite systems and their associated ground terminals without departing from the scope of the invention.

The command and data signals are transmitted to the relay satellite through a forward link 20. In the representative embodiments in which the TDRSS relay satellite is used, the commands are transmitted through the forward link 20 at a K-Band frequency. As mentioned above, the TDRSS ground terminal 16 includes a QPSK modulator for transmitting commands and control data as spread spectrum signals. During normal ground terminal operation, i.e. when the system is not in a range safety configuration, the forward link power ratio between the I and Q channels of the QPSK modulator is preferably set at approximately 10:1, so that the majority of the power is utilized for transmitting flight data to the vehicle through the pilot or I channel. When range safety commands are being transmitted, in accordance with the present invention, the I to Q power ratio is preferably altered to approximately a 1:1 ratio. The 1:1 power ratio reduces the time required by the receiver to reliably detect each of the range safety command sequences, as will be described in more detail below. At the relay satellite 22, the command signal is amplified, translated to a different downlink frequency, which in the TDRSS embodiments is an S-Band frequency, and retransmitted through a second link 24 either directly to the launch vehicle 12, or to the launch vehicle through a second, lower orbit satellite (not shown). In the launch vehicle 12, receiving structure detects and processes the command signals, as will be described in more detail below.

Figure 2:
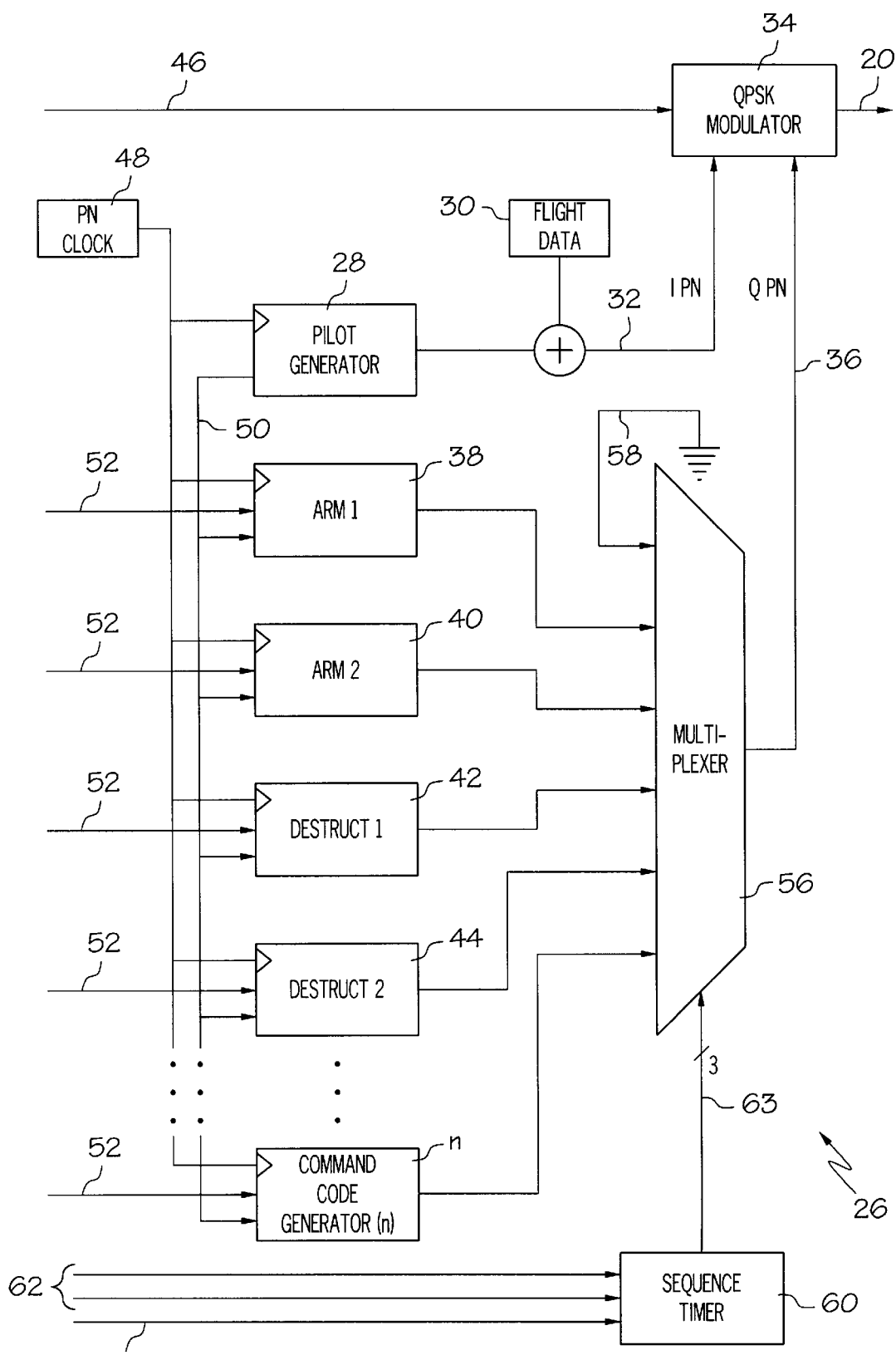
FIG. 2 is a block diagram of representative ground terminal transmitting structure in accordance with the present invention.

FIG. 2 depicts a representative embodiment of the transmitting structure 26 provided in the ground terminal 16 for modulating and transmitting range safety commands to a vehicle in accordance with the present invention. As shown in FIG. 2, the transmitting structure 26 includes a short code or pilot generator 28, which may be similar to existing short code generators presently being used to transmit flight data to launch vehicles. The generator 28 is preferably set to any one of 85 standard user codes presently being used for spreading flight data. In addition, the period of the short code generated by generator 28 is preferably 1023 chips in order to coincide with the length of existing standard short codes. The pilot code from generator 28 is applied directly to the I channel 32 of the QPSK modulator 34. During normal operation of the vehicle 12, the pilot code from generator 28 is modulo-2 added to flight data, shown as 30, in order to spread the data for transmission to the vehicle. The flight data 30 spread by the pilot code on the I channel does not include range safety command messages, which are represented by distinct PN sequences transmitted separately on the Q channel 36 of the modulator 34, as will be described in more detail below.

In addition to the pilot code generator 28, one or more additional code generators are provided in the transmitting structure 26. These additional code generators are similar in function to the pilot generator 28, but produce distinct PN sequences or codes, each of which is associated with a range safety command. In the representative embodiment shown in FIG. 2, the transmitting structure includes four additional code generators (38, 40, 42 and 44). The first two of these generators, 38, 40 generate PN sequences which correspond to the Arm command, and the second two of these generators, 42, 44 generate PN sequences which correspond to the Destruct command. While FIG. 2 depicts and the discussion will focus on only four command code generators for purposes of clarity, it is to be understood that any number of command code generators, as indicated by n in the figure, may be provided without departing from the scope of the invention. These additional command code generators may be utilized for Safe and/or Test commands, or any other command which may be deemed necessary or desirable depending upon the particular application of the invention. In addition, the invention is not to be limited to the use of two command code generators and associated sequences per range safety command. Rather, any number of generators and distinct PN sequences may be associated with each range safety command depending upon the particular application of the invention.

In the present invention, the period of the PN sequences from generators 38–44 is the same as the short code period of generator 28, to enable the epochs of the command code sequences to be synchronized with the short code epoch. The synchronization of the short code and command code epochs continuously locks the command and pilot code sequences together, and eliminates the need for the receiving structure to search for the command sequences as will be described in more detail below.

As shown in FIG. 2, a timing control such as PN clock 48 is preferably associated with both the pilot and command code generators 28, 38–44 for controlling the generation of the pilot and command PN sequences. Controlling each of the generators 28, 38–44 with the same PN clock 28 assures that the generators operate at the same frequency, thereby enabling the epochs of the sequences to be synchronized. Alternatively, the generators may be controlled by separate clocks which are synchronized together and operate at the same frequency.

To further assure time alignment between the pilot and command PN sequence generators 28, 38–44 in the event of a fault or other problem in the PN clock 48 or the generators, an epoch sync pulse may be periodically transmitted from the pilot generator to the command sequence generators. This sync pulse, shown as 50 in FIG. 2, is preferably transmitted at the epoch of the pilot sequence to reinitiate the command sequence generators at the sequence epoch in the event that the generators are not already at the epoch.

The command PN sequences generated by generators 38–44 are preferably changed for each flight, in order to protect the security of the system. The command sequences for a particular flight will typically be selected by the range safety team designated for the flight. Once selected, the command PN sequences are preferably loaded into non-volatile memory associated with each of the generators 38–44 through input lines 52, and into generators 74–80 in the vehicle range safety receiving structure through lines 54 shown in FIG. 4, using standard digital fill devices. The range safety receiving structure, which will be described in more detail below, preferably includes one or more PROM chips for storing the selected range safety command sequences. The epoch sync pulse 50 described above synchronizes the pilot code and command PN sequences by resetting the addresses for the non-volatile memory, in which the selected command PN sequences are stored, to zero.

The command PN sequences from the generators 38–44 are fed to selection structure, which serves to selectively apply the PN command sequences to the Q channel 36 of the modulator 34. In the representative embodiment shown in FIG. 2, the selection structure includes a multiplexer 56, which in addition to being connected to the generators, is also connected to ground, as shown at 58. During normal flight, when the range safety system is inactive, the multiplexer 56 is set to the grounded input at line 58 so that there is no signal on the Q channel. In addition to the multiplexer 56, the selection structure also preferably comprises a sequence timer 60 which controls the timing and transmission of the range safety command sequences from the generators 38–44. As shown in FIG. 2, when a command request is issued from the command center 14, it is transmitted to the sequence timer 60 through one or more connections 62. The sequence timer 60 preferably includes a connection 62 for each of the possible range safety commands. Only two connections 62 are shown in FIG. 2 one each for the Arm and Destruct commands shown in the representative embodiment. However, additional connections may be utilized for additional commands without departing from the scope of the invention. In addition, the sequence timer includes a sequence timer command line 61 for use in setting the sequence timing.

Figure 3:
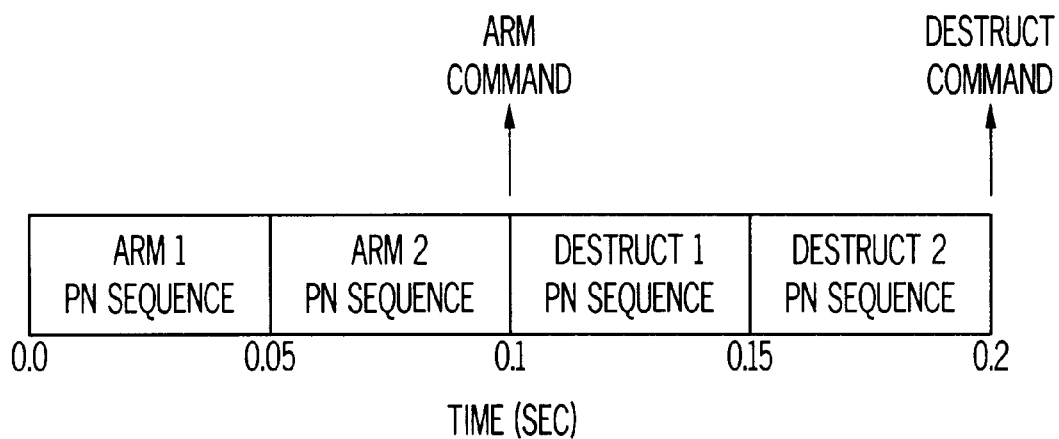
FIG. 3 is a schematic diagram of a representative command timing sequence for the present invention.

Upon receipt of a command request signal, the sequence timer 60 generates one or more addresses which are transmitted through lines 63 to the multiplexer 56 to selectively route the output from one or more of the command PN sequence generators 38–44 to the Q channel 36. Preferably, during execution of a command, the command PN sequence generators pertaining to the requested command are routed one at a time to the Q channel 36 at predetermined time intervals which are controlled by a clock in the timer. An example of a timing sequence for an Arm/Destruct command sequence, utilizing the PN generators of the representative embodiment, is shown in FIG. 3.

In the representative embodiment shown in FIG. 2, the sequence timer 60 would control the multiplexer 56 such that the command PN sequence generators 38–44 would be selectively routed or switched to the Q channel 36 at 50 ms intervals so that the entire sequence, in which two generators are switched for each of the Arm and Destruct commands, may be carried out in 0.2 seconds. While in the representative embodiment shown, the time interval for switching between the outputs of the command PN sequence generators 38–44 is 0.05 seconds, it is to be understood that different time intervals may be employed depending upon the desired length of time for execution of the complete Arm/Destruct or other range safety command series and, accordingly, that the invention is not to be limited to any particular timing sequence.

Figure 4:
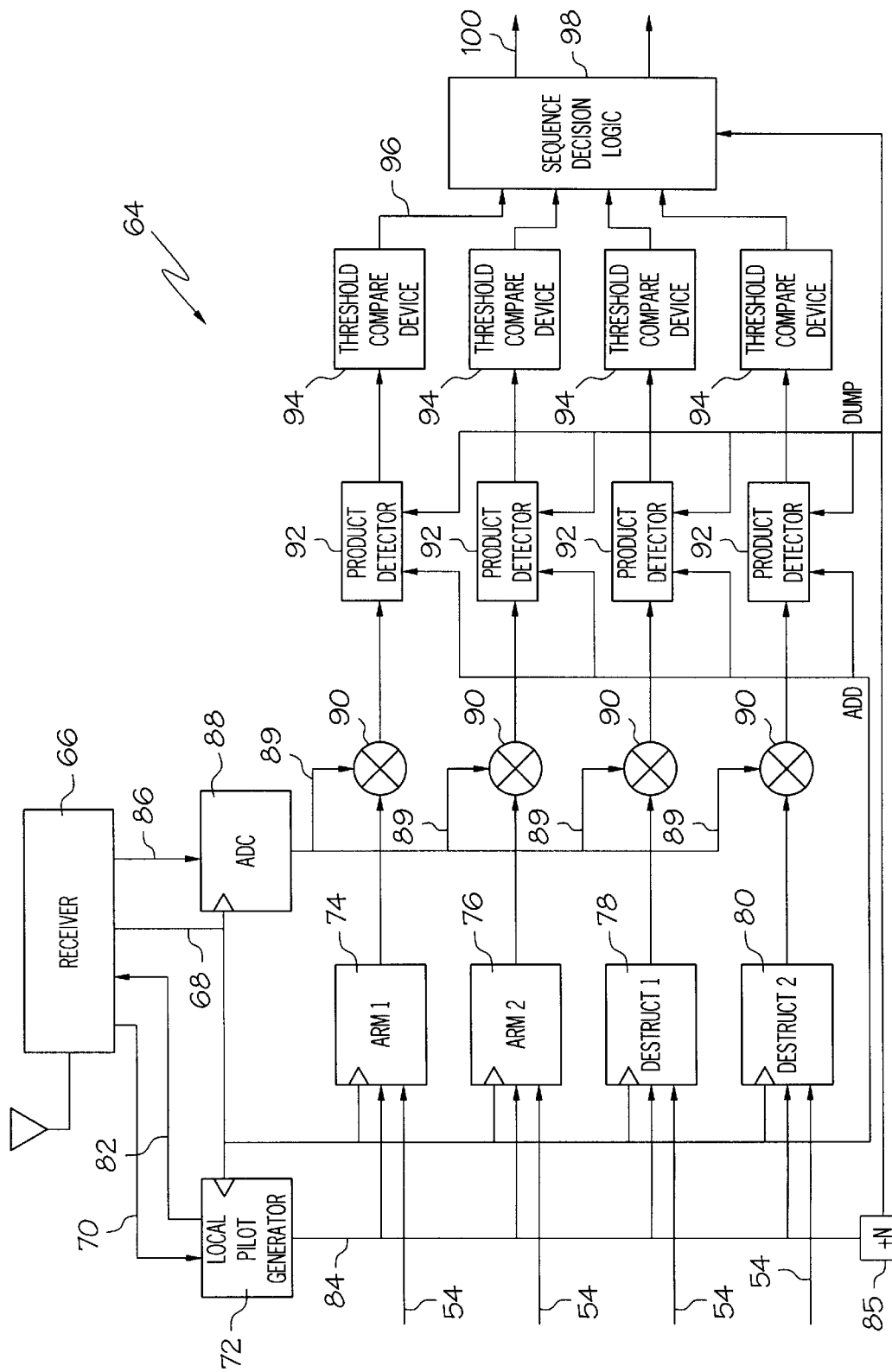
FIG. 4 is a block diagram of representative vehicle receiving structure in accordance with the present invention.

The QPSK modulator 34 modulates a carrier signal 46 with the pilot code on the I channel and the selectively applied range safety command PN sequences on the Q channel to form a modulated command signal. The modulated command signal is transmitted on the forward link 20 to the relay satellite 22. While the carrier signal 46 is modulated by both the I and Q channel signals in the range safety configuration of the present invention, during normal flight, in the absence of a range safety command request, the multiplexer 56 will be set to the grounded input and the carrier signal will be spread only by the short code on the I channel. While a QPSK modulator is shown in the representative embodiments, and is the type of modulator presently used in conjunction with the TDRSS relay satellite system, it should be understood that other modulation systems which provide for a dedicated channel for the range safety command sequences may also be utilized without departing from the scope of the invention FIG. 4 depicts a representative embodiment for the range safety receiving structure, designated generally as 64, in accordance with the present invention. The receiving structure 64 is preferably provided in the vehicle 12, and is preferably a complement to the ground terminal transmitting structure 26 shown in FIG. 2. As shown in FIG. 4, the receiving structure 64 includes a receiver 66, which in the representative embodiments is a QPSK spread spectrum receiver. The receiver 66 may be any type of QPSK spread spectrum receiver known in the art which provides for carrier locking, alignment of a local pilot sequence, provided by local pilot generator 72 on line 82, with the pilot code component of the modulated command signal, and recovery of an analog baseband command sequence and noise signal from the Q channel. In addition to the above, the receiver 66 also preferably provides a PN clock signal, identified as 68 in FIG. 4, which is aligned with the PN clock signal in the transmitting structure in a conventional manner when the receiver locks onto the carrier. The receiver 66 also preferably provides an epoch timing control signal 70 which may be used to adjust the phase of the local pilot PN sequence generator 72, which generates the same pilot code as the transmitter pilot generator 28, in order to match or lock the local pilot sequence from the generator 72 to the received pilot sequence.

In addition to the local pilot PN sequence generator 72, the receiving structure 64 also includes one or more local command PN sequence generators which are a complement to the command PN sequence generators in the transmitting structure 26. Four local command PN sequence generators 74, 76, 78 and 80 are shown in FIG. 4, the first two of these generators, 74, 76 correspond to the Arm command, and the second two generators 78, 80 correspond to the Destruct command. While only four generators are shown in FIG. 4, two corresponding to the Arm command and two to the Destruct command, it is to be understood that any number of generators may be utilized in the present invention without departing from the scope of the invention, provided each generator coincides with a generator in the transmitting structure 26.

As shown in FIG. 4, the local pilot generator 72 and the local command generators 74–80 are preferably controlled by the PN clock signal 68 from receiver 66. Controlling the local pilot and command generators by this single PN clock signal synchronizes the operation of the generators in the receiver, in the same manner as the PN clock signal 48 synchronizes the generators in the transmitting structure 26, so that the PN sequences are continuously locked together. In addition, an epoch timing control sync pulse, identified as 84, similar to that used in the transmitting structure 26, is preferably transmitted from the local pilot generator 72 to the command sequence generators 74–80 to assure synchronization of the pilot and command sequences in the event of a fault or other problem in the sequence generators or receiver.

To detect a range safety command in the vehicle, the analog baseband command sequence and noise signal 86 recovered by the receiver 66 is compared to each of the locally generated command sequences from generators 74–80 over predetermined time intervals or acquisition periods. If at the end of each acquisition period any one of the local command sequences exceeds a predetermined level of correspondence with the received command sequence, then the command corresponding to that sequence is activated. If there is more than one command sequence associated with a range safety command, such as in the embodiment discussed above, then the command is activated when all of the associated local command sequences correspond with the received command sequence in a predetermined order and within a predetermined time interval.

In the embodiment shown in FIG. 4, the range safety commands are detected in the receiving structure 64 by first quantizing or sampling the analog baseband command sequence plus noise signal 86 recovered by the receiver 66 at the PN clock rate with an analog-to-digital converter 88. From the converter 88, the baseband signal samples 89 are transmitted to a plurality of multipliers 90, which each in turn is connected to an output from one of the command sequence generators 74–80. The multipliers 90 multiply the baseband signal samples 89 with output samples from each of the command sequence generators 74–80. If the output from a command sequence generator is a "1", the baseband command sequence plus noise sample is multiplied by a 1. If the command sequence generator output is a "0", the baseband command sequence plus noise sample is multiplied by −1. The product of each command sequence generator and baseband sequence plus noise sample are applied to separate integrate and dump product detectors 92 which sum the sample products for a predetermined acquisition period. In the embodiment depicted, the products are summed over an acquisition period of 0.05 ms. This time period corresponds to the sequence timing intervals in the transmitting structure.

At the end of an acquisition period, each sum from the product detectors 92 is transmitted to a separate threshold compare device 94. The threshold compare devices 94 compare the absolute value of each sum with a predetermined threshold. The predetermined threshold may be any quantity depending on the application, and is preferably based upon the number of chips in a command sequence and the signal-to-noise ratio for the system. In general, the predetermined threshold preferably corresponds to the sum which would be obtained if successive baseband command sequence samples match successive chips from any one of the command sequence generators 74–80. A Hit Detect signal is generated by the threshold compare devices 94 when a sum exceeds the predetermined threshold. Preferably, only a single threshold compare device 94 will generate a Hit Detect signal at the end of each acquisition period in the range safety configuration, and no Hit Detect signals will be generated during normal flight, i.e. in the absence of any range safety command requests.

The Hit Detect signals are transmitted, as shown at 96, from the threshold compare devices 94 to command sequence decision logic 98 for the vehicle. The decision logic 98 evaluates the source of the hit detect signals and the order and time in which they are received to determine whether to activate a command. If the appropriate Hit Detect signals for a particular command are received in the correct, preselected order and time intervals, then the command sequence decision logic will issue a signal 100 to activate the command. For example, using the representative timing sequence shown in FIG. 3, if Hit Detect signals from the threshold compare devices corresponding to the Arm 1 and Arm 2 command sequences are each detected by the decision logic 98 within a 0.1 second time interval, the decision logic will activate the Arm command. If Hit Detect signals are then detected from the threshold compare devices corresponding to the Destruct 1 and Destruct 2 sequences, within the next successive 0.05 second intervals after the Arm command has been activated, the command sequence decision logic will activate the Destruct command. Thus, for the representative embodiment shown, the entire Arm/Destruct sequence will be executed in 0.2 seconds.

In addition to assuring generator synchronization, the epoch sync pulse on line 84 is also supplied by way of divider 85 to the product detectors 92 and the decision logic 98. The value N in the divider 85 is selected to provide the desired acquisition period, and may be any number provided it is divisible evenly into the sync pulse frequency. The pulse from divider 85 dumps the sums from the I&D detectors 92 to the threshold compare devices 94 at the end of the acquisition period. In addition, it serves as the timing reference for the decision logic 98 in order to update the timing intervals for command detection.

Accordingly, as described above, in the present invention, one or more command PN sequence generators are provided for generating one or more distinct PN sequences which have been selected to correspond to particular range safety commands. The PN sequence generators are synchronized to a pilot code generator, which generates a pilot sequence that is transmitted on the I channel to the vehicle during flight. In the event it becomes necessary to issue a range safety command, the PN sequences associated with the command are selectively applied to the Q channel of the QPSK modulator at predetermined time intervals. The command PN sequences are transmitted on the Q channel, while the pilot sequence, to which the command sequences are synchronized, is transmitted on the I channel. The pilot sequence serves to prealign the local command sequence generators in the launch vehicle receiving structure with the command sequence generators in the transmitting structure, thereby eliminating the need for the receiving structure to search for the command sequences when processing a range safety command. In the vehicle, the command sequences on the Q channel are matched with the locally generated command sequences in order to detect and activate the command.

In the present invention, range safety commands are transmitted as distinct PN sequences on the Q channel, along with the pilot code on the I channel, thereby eliminating the need for the down range tracking stations and dual-tone codes used in prior systems. The distinct PN sequences utilized in the present invention are more complex than the eleven character dual-tone codes of prior systems due to their 1023 chip period, yet can be transmitted in less time. Therefore, the use of distinct PN sequences increases the security of the range safety command codes without increasing the transmission time.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments shown and described were chosen in order to best illustrate the principles of the invention and its practical application, to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for transmitting one or more range safety command signals from a ground terminal transmitter to a vehicle receiving unit, the method comprising the steps of:

storing identical command codes in the transmitter and receiving unit prior to launch of the vehicle;

generating a transmitter pilot code;

generating one or more transmitter command codes in the transmitter;

applying the transmitter pilot code to a first channel of a modulator in the transmitter according to a clock signal;

selectively applying the one or more transmitter command codes to a second channel of the modulator in the transmitter according to the clock signal, such that the one or more transmitter command codes are synchronized to the transmitter pilot code by the clock signal;

modulating a carrier signal with the pilot and one or more transmitter command codes;

transmitting the modulated carrier signal to the receiving unit;

recovering the one or more transmitter command codes and transmitter pilot code in the receiving unit;

generating a local pilot code in the receiving unit which is synchronized to the transmitter pilot code recovered by the unit;

generating one or more local command codes in the receiving unit;

providing a receiver clock signal in the receiving unit which is aligned with the clock signal in the transmitter;

synchronizing the local command code to the local pilot code using the receiver clock signal;

using the recovered transmitter pilot code, synchronizing the one or more local command codes with the one or more transmitter command codes;

comparing the one or more recovered transmitter command codes with the one or more local command codes to detect the one or more range safety command signals; and if a detected range safety command signal is equivalent to a destruct command, substantially destroying the vehicle while the vehicle is in flight.

2. The method as recited in claim 1 wherein the transmitter pilot code and the one or more transmitter and local command codes comprise PN sequences.

3. The method as recited in claim 1, wherein the transmitter pilot and command codes are further synchronized by resetting a memory address for the command codes to zero at an epoch of the transmitter pilot code.

4. The method as recited in claim 1, further comprising the step of transmitting the modulated carrier signal through a signal relay.

5. The method as recited in claim 1, wherein the selectively applying step occurs in response to a command request.

6. The method as recited in claim 1, wherein the transmitter pilot and command codes are transmitted to the receiving unit by spread spectrum.

7. A method for transmitting one or more range safety commands from a transmitting structure in a ground station to a receiving structure in a launch vehicle, the method comprising the steps of:

storing identical command PN sequences in the transmitting and receiving structures prior to launch of the vehicle;

generating a transmitter pilot code;

generating a plurality of distinct transmitter command PN sequences, each of the transmitter command PN sequences corresponding to one of the range safety commands and having a period equal to and synchronized with the period of the transmitter pilot code according to a clock frequency in the transmitting structure;

applying the transmitter pilot code to a first channel of a modulator;

selectively applying one or more of the transmitter command PN sequences to a second channel of the modulator;

modulating a carrier signal with the transmitter pilot code and the one or more transmitter command PN sequences applied to the modulator;

transmitting the modulated carrier signal to the receiving structure through a signal relay;

recovering the one or more transmitter command PN sequences and the transmitter pilot code in the receiving structure;

generating one or more local command PN sequences in the receiving structure;

generating a local pilot code in the receiving structure;

synchronizing the one or more local PN sequences to the local pilot code according to the clock frequency;

using the recovered transmitter pilot code, synchronizing the one or more local command PN sequences to the one or more recovered transmitter command PN sequences; and comparing the recovered one or more transmitter command PN sequences with each of the local command PN sequences to detect the one or more range safety commands.

8. The method as recited in claim 7, wherein the step of comparing the recovered one or more transmitter command PN sequences and local command PN sequences includes, sampling the recovered transmitter command PN sequences, multiplying each of the transmitter command PN sequence samples with at least a bit of each of the local command PN sequences to form products associated with the local command PN sequences, separately summing the products of the transmitter command PN sequence samples and the at least one bit of each of the local command PN sequences during an acquisition period, and comparing each sum to a predetermined threshold at the end of the acquisition period to detect the one or more range safety commands.

9. The method as recited in claim 7, wherein one or more of the transmitter command PN sequences are applied to the modulator in response to a command request.

10. A communications system for transmitting one or more commands between a ground terminal and a launch vehicle, the system comprising:

transmitting structure associated with the ground terminal, the transmitting structure comprising, a first code generator adapted to generate a transmitter pilot code, at least one additional code generator, each additional code generator adapted to generate a transmitter command code, a timing control adapted to provide a clock signal to continuously lock the transmitter command codes with the transmitter pilot code, and a modulator adapted to combine the transmitter pilot code and one or more transmitter command codes with a carrier signal to provide a modulated command signal;

a communications link adapted to transmit the modulated command signal;

receiving structure located in the launch vehicle adapted to receive and demodulate the modulated command signal, the receiving structure comprising,
  a second code generator adapted to generate a local pilot code,
  a receiver adapted to recover the transmitter pilot and command codes and to align the local pilot code with the recovered transmitter pilot code; and
  at least one local command code generator, aligned to the local pilot code, and adapted to generate one or more local command codes corresponding to the transmitter command codes to detect the commands; and
a pyrotechnic in the launch vehicle adapted to substantially destroy the launch vehicle during flight upon detection of a destruction command by the receiving structure.

11. The system as recited in claim 10, wherein the transmitter pilot code and at least one transmitter command code comprise distinct PN sequences.

12. The system as recited in claim 11, wherein the transmitter command PN sequences represent range safety commands for the launch vehicle.

13. The system as recited in claim 10, further comprising selection structure for selectively applying at least one transmitter command code to the modulator.

14. The system as recited in claim 13, wherein the selection structure further comprises a sequence timer for selectively applying the command codes to the modulator at predetermined intervals.

15. The system as recited in claim 10, wherein the modulator and receiver are adapted for QPSK spread spectrum communications.

16. The system as recited in claim 10, wherein the communications channel includes a relay satellite.

17. A method for transmitting one or more command signals from a ground terminal to a vehicle, the method comprising the steps of:
  generating a transmitter pilot code;
  generating one or more transmitter command codes;
  applying the transmitter pilot code to a first channel of a modulator;
  selectively applying the one or more transmitter command codes to a second channel of the modulator;
  modulating a carrier signal with the pilot and one or more transmitter command codes;
  transmitting the modulated carrier signal to a receiver;
  recovering the one or more transmitter command codes and transmitter pilot code in the receiver;
  generating one or more local command codes;
  using the recovered transmitter pilot code, synchronizing the one or more local command codes with the transmitter command codes; and
  comparing the one or more recovered transmitter command codes with the one or more local command codes to detect the one or more command signals, wherein at least one transmitter command code is synchronized to the transmitter pilot code by resetting a memory address for the command codes to zero at an epoch of the transmitter pilot code.

18. A communications system for transmitting one or more commands between a ground terminal and a launch vehicle, the system comprising:
  transmitting structure associated with the ground terminal, the transmitting structure comprising,
    a first code generator for generating a transmitter pilot code,
    at least one additional code generator, each additional code generator generating a transmitter command code,
    a timing control for continuously locking the transmitter command codes with the transmitter pilot code, and
    a modulator for combining the transmitter pilot code and one or more transmitter command codes with a carrier signal to provide a modulated command signal;
  a communications link for transmitting the modulated command signal;
  receiving structure located in the launch vehicle for receiving and demodulating the modulated command signal, the receiving structure comprising,
    a second code generator for generating a local pilot code,
    a receiver for recovering the transmitter pilot and command codes and aligning the local pilot code with the recovered transmitter pilot code; and
    at least one local command code generator, aligned to the local pilot code, for generating one or more local command codes corresponding to the transmitter command codes to detect the commands;
  selection structure for selectively applying at least one transmitter command code to the modulator, wherein the selection structure further comprises a sequence timer for selectively applying the command codes to the modulator at predetermined intervals.

19. A communications system for transmitting one or more commands between a ground terminal and a launch vehicle, the system comprising:
  transmitting structure associated with the ground terminal, the transmitting structure comprising,
    a first code generator for generating a transmitter pilot code,
    at least one additional code generator, each additional code generator generating a transmitter command code,
    a timing control for continuously locking the transmitter command codes with the transmitter pilot code, and
    a modulator for combining the transmitter pilot code and one or more transmitter command codes with a carrier signal to provide a modulated command signal;
  a communications link for transmitting the modulated command signal; and,
  receiving structure located in the launch vehicle for receiving and demodulating the modulated command signal, the receiving structure comprising,
    a second code generator for generating a local pilot code,
    a receiver for recovering the transmitter pilot and command codes and aligning the local pilot code with the recovered transmitter pilot code; and
    at least one local command code generator, aligned to the local pilot code, for generating one or more local command codes corresponding to the transmitter command codes to detect the commands;
  wherein the modulator and receiver are adapted for QPSK spread spectrum communications.

* * * * *